US007233447B2

(12) United States Patent
Baba (10) Patent No.: US 7,233,447 B2
(45) Date of Patent: Jun. 19, 2007

(54) ZOOM LENS AND PROJECTION DISPLAY DEVICE WHICH USES SAME

(75) Inventor: Tomoyuki Baba, Ageo (JP)

(73) Assignee: Fujinon Corporation, Saitama (JP)

( * ) Notice: Subject to any disclaimer, the term of this patent is extended or adjusted under 35 U.S.C. 154(b) by 0 days.

(21) Appl. No.: 11/193,484

(22) Filed: Aug. 1, 2005

(65) Prior Publication Data

US 2006/0077564 A1   Apr. 13, 2006

(30) Foreign Application Priority Data

Sep. 24, 2004   (JP) .............................. 2004-277407

(51) Int. Cl.
*G02B 15/14* (2006.01)
(52) U.S. Cl. ...................... 359/680; 359/676
(58) Field of Classification Search ......... 359/676–683
See application file for complete search history.

(56) References Cited

U.S. PATENT DOCUMENTS

| 5,914,820 | A | 6/1999 | Takimoto et al. ........... 359/686 |
| 6,590,716 | B2 | 7/2003 | Narimatsu .................. 359/679 |
| 6,639,737 | B2 | 10/2003 | Yasui et al. ................. 359/761 |
| 7,079,324 | B2 * | 7/2006 | Yamasaki ................... 359/680 |

2004/0125462 A1 * 7/2004 Misaka ....................... 359/684

FOREIGN PATENT DOCUMENTS

| JP | 2001-337275 | 12/2001 |
| JP | 2001-350096 | 12/2001 |
| JP | 2003-15037 | 1/2003 |
| JP | 2003-15038 | 1/2003 |

* cited by examiner

*Primary Examiner*—Scott J. Sugarman
*Assistant Examiner*—M. Hasan
(74) *Attorney, Agent, or Firm*—Arnold International; Jon W. Henry; Bruce Y. Arnold (57) ABSTRACT

A zoom lens for a projection display device includes, in order from the long conjugate length side, a first lens group having negative refractive power and including at least one aspheric surface, a second lens group having positive refractive power and including at least two lens components, a third lens group, a fourth lens group having positive refractive power, and fifth and sixth lens groups. The second, third, fourth, and fifth lens groups move with coordinated movements during zooming. Preferably, the zoom lens satisfies three conditions related to the wide-angle and telephoto focal lengths and the focal lengths of the third and fifth lens groups, the fifth lens group has positive refractive power, and the first and fifth lens groups have particular lens element and lens component constructions. A projection display device uses the zoom lens.

16 Claims, 5 Drawing Sheets

Fig. 1

Spherical Aberration
Fig. 2A

Astigmatism
Fig. 2B

Distortion
Fig. 2C

Lateral Color
Fig. 2D

Spherical Aberration
Fig. 2E

Astigmatism
Fig. 2F

Distortion
Fig. 2G

Lateral Color
Fig. 2H

Fig. 3

Spherical Aberration
Fig. 4A

Astigmatism
Fig. 4B

Distortion
Fig. 4C

Lateral Color
Fig. 4D

Spherical Aberration
Fig. 4E

Astigmatism
Fig. 4F

Distortion
Fig. 4G

Lateral Color
Fig. 4H

Fig. 5

ZOOM LENS AND PROJECTION DISPLAY DEVICE WHICH USES SAME

TECHNICAL FIELD OF THE INVENTION

The present invention relates to a zoom lens that is suitable as a projection lens for enlarging and projecting information from a display, and to a projection display device that uses such a zoom lens.

BACKGROUND OF THE INVENTION

Recent developments of projection display devices that can enlarge and project information from a display, such as a light valve, a computer image or a television image have been remarkable. A zoom lens, which is capable of changing the size of a projected image, is frequently used as the projection lens in projection display devices. More recently, a zoom lens having a large ratio of change, i.e., a zoom lens having a large zoom ratio, has been increasingly desired.

A so-called lens shift projection function in which an image greatly shifts in position relative to the projection display device during projection and a function in which a large projected image can be seen in a position close to a projection display device have also been required, which, in turn, requires widening the projection angle of the zoom lens. Additionally, such a zoom lens with a widened projection angle that provides a brighter and sharper image has been desired.

Zoom lenses in which three or more lens groups are moved during zooming and that are telecentric, or at least nearly telecentric, on the short conjugate length side are known, and are, for example, described in Japanese Patent No. 3,362,613 and Japanese Laid-Open Patent Application Nos. 2001-337275, 2001-350096, 2002-131641, 2003-015036, 2003-015037, and 2003-015038. The zoom lenses described in Japanese Patent No. 3,362,613 and Japanese Laid-Open Patent Application Nos. 2001-337275 and 2001-350096 have a zoom ratio of 1.5 or more, but a zoom lens that includes a larger field angle is presently desired. On the other hand, the zoom lenses of Japanese Laid-Open Patent Application Nos. 2002-131641, 2003-015036, 2003-015037, and 2003-015038 are wide-angle zoom lenses that include field angles of sixty degrees or more, but their zoom ratios are smaller. Additionally, many of the prior art zoom lenses have f-numbers of 1.8 or more, and a brighter lens is presently desired for marketing.

As described above, zoom lenses are available that achieve one of the required wide-angle projection or the desired zoom ratio, but there are no zoom lenses that achieve both or that further satisfy the brightness requirements. The difficulty of simultaneously satisfying the wide-angle, zoom ratio, and brightness requirements is indicated by the zoom lenses presently used as projection lenses of projection display devices.

BRIEF SUMMARY OF THE INVENTION

The present invention relates to a bright zoom lens having a relatively large zoom ratio, favorably corrected aberrations, and that provides a wide-angle image for projection purposes, and to a projection display device using such a bright zoom lens.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

Figure 1:
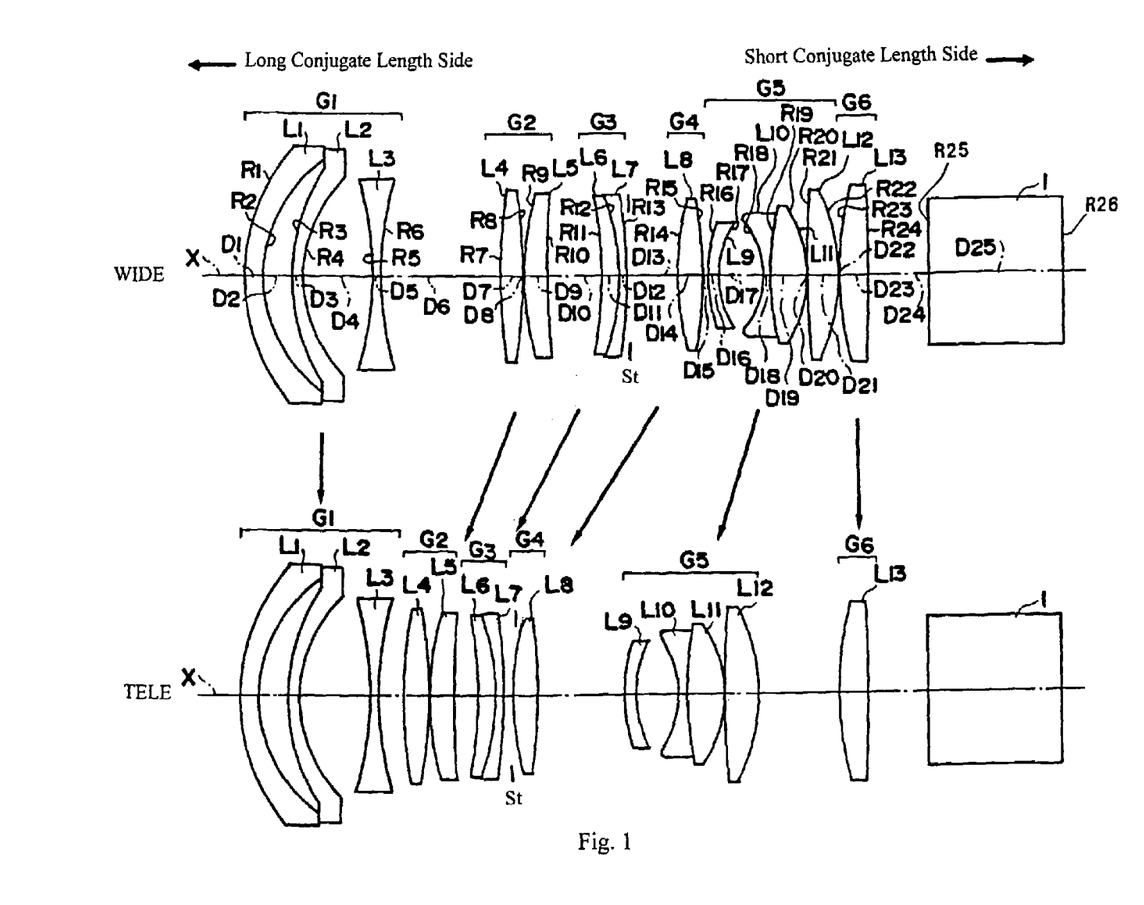
FIG. 1 shows cross-sectional views of the zoom lens of Embodiment 1 at the wide-angle end (WIDE) and at the telephoto end (TELE)

A general description of the zoom lens of the present invention that pertains to the two disclosed embodiments of the invention will first be described with reference to FIG. 1 that shows Embodiment 1. The long conjugate length side of the zoom lens is on the left side as shown in FIG. 1 and the short conjugate length side of the zoom lens is on the right side as shown in FIG. 1. In FIG. 1, lens elements are referenced by the letter L followed by a number denoting their order from the long conjugate length side of the zoom lens along the optical axis X, from L1 to L13. The radii of curvature of the optical surfaces are referenced by the letter R followed by a number denoting their order from the long conjugate length side of the zoom lens, from R1 to R26. The on-axis surface spacings along the optical axis X of the optical surfaces are referenced by the letter D followed by a number denoting their order from the long conjugate length side of the zoom lens, from D1 to D25. In the same manner, six lens groups are labeled G1–G6, in order from the long conjugate length side of the zoom lens, and the optical components belonging to each lens group are indicated by brackets adjacent the labels G1–G6.

In the zoom lens of the present invention, the first and sixth lens groups, G1 and G6, are fixed during zooming, and zooming is performed by moving the second, third, fourth, and fifth lens groups, G2, G3, G4, and G5, respectively, along the optical axis X. As shown in FIG. 1, downwardly directed arrows indicate generally the locus of points of the direction of movement along the optical axis X of the four lens groups that move during zooming from the wide-angle end to the telephoto end of the zoom range. As shown in FIG. 1, in the zoom lens of the present invention, the second, third, fourth, and fifth lens groups, G2, G3, G4, and G5, move along the optical axis X toward the long conjugate length side during zooming. The zoom lens of the present invention is designed to be telecentric, or at least nearly telecentric, on the short conjugate length side. The phrase "nearly telecentric" means that slight variations from exact telecentricity may occur at various image heights at least at some zoom settings but that the variations remain small in comparison to comparable prior zoom lenses that do not include telecentricity in their design criteria.

The term "lens group" is defined in terms of "lens elements" and "lens components" as explained herein. The term "lens element" is herein defined as a single transparent mass of refractive material having two opposed refracting surfaces that are oriented at least generally transverse to the optical axis of the zoom lens. The term "lens component" is herein defined as (a) a single lens element spaced so far from any adjacent lens element that the spacing cannot be neglected in computing the optical image forming properties of the lens elements or (b) two or more lens elements that have their adjacent lens surfaces either in full overall contact or overall so close together that the spacings between adjacent lens surfaces of the different lens elements are so small that the spacings can be neglected in computing the optical image forming properties of the two or more lens elements. Thus, some lens elements may also be lens components. Therefore, the terms "lens element" and "lens component" should not be taken as mutually exclusive terms. In fact, the terms may frequently be used to describe a single lens element in accordance with part (a) above of the definition of a "lens component." Alternatively, a lens component may frequently be made by cementing together two lens elements. The term "lens group" is herein defined as an assembly of one or more lens components in optical series and with no intervening lens components along an optical axis that during zooming is movable as a single unit relative to another lens component or other lens components.

The first lens group G1 has negative refractive power, preferably strong negative refractive power, and includes at least one aspheric lens surface. The second lens group G2 has positive refractive power, includes at least two lens elements and/or lens components, and may be provided with at least two aspheric lens surfaces. As used herein, phrases such as "lens element and/or lens component" refer to a lens structure that may be a single lens element (for example, lens element L1 or lens element L2 of FIG. 1) which are also lens components, or that may be a lens component formed of more than one lens element (for example, a lens component formed of two or more lens elements that may be cemented together, or that may be a spherical lens element and made of glass that is coated with a plastic aspheric coating that is an additional lens element of a lens component having an aspheric surface). However, unless otherwise specified, a lens structure identified as a "lens element and/or lens component" or as a "lens component" may preferably be formed as a single lens element in order to simplify the construction of the zoom lens as a whole. The fourth lens group G4 and the sixth lens group G6 have positive refractive power.

In the zoom lens of the present invention, lens group G1 includes at least one aspheric surface. The lens surfaces that are aspheric are defined using the following equation:

$$Z=[(C \cdot Y^2)/\{1+(1-K \cdot C^2 \cdot Y^2)^{1/2}\}]+\Sigma(A_i \cdot Y^i) \quad \text{Equation (A)}$$

where
  Z is the length (in mm) of a line drawn from a point on the aspheric lens surface at a distance Y from the optical axis to the tangential plane of the aspheric surface vertex,
  C is the curvature (=1/the radius of curvature, R in mm) of the aspheric lens surface on the optical axis,
  Y is the distance (in mm) from the optical axis,
  K is the eccentricity, and $A_i$ is the ith aspheric coefficient, and the summation extends over i.

In Embodiments 1 and 2 of the present invention that will be described below, aspheric coefficients other than those listed are zero, and both surfaces of the second lens element L2, which belongs to the first lens group G1, are aspheric. In particular, in Embodiments 1 and 2 of the present invention described below only aspheric coefficients $A_4$, $A_6$, $A_8$, and $A_{10}$ are nonzero.

Preferably, the following condition is satisfied:

$$Ft/Fw \geq 1.5 \quad \text{Condition (1)}$$

where
  Ft is the focal length of the zoom lens at the telephoto end when the zoom lens is focused at infinity on the long conjugate length side, and
  Fw is the focal length of the zoom lens at the wide-angle end when the zoom lens is focused at infinity on the long conjugate length side.

Condition (1) defines a zoom ratio of 1.5 or greater.

In the zoom lens of the present invention, positive refractive power is dispersed among various lens groups, including the second lens group G2, the fourth lens group G4, and the sixth lens group G6, and the first lens group G1 includes at least one aspheric surface in order to suppress aberrations. Additionally, the second lens group G2 includes at least two lens elements and/or lens components. These features enable a bright, wide-angle zoom lens having a relatively large zoom ratio and favorably corrected aberrations, and thus a lens that is suitable for projection purposes, to be designed.

In this zoom lens, the first lens group G1, which has negative refractive power, is preferably fixed during zooming and moves for focusing so that the focus action is arranged on the long conjugate length side. On the other hand, the sixth lens group G6, which is arranged on the short conjugate length side, has positive refractive power and is also fixed during zooming. Arranging a first lens group G1 having strongly negative refractive power on the long conjugate length side is suited to ensure a long back focus, and the first lens group G1 is preferably fixed during zooming in order to help limit the diameter of the lens elements of the first lens group G1, which have the largest diameters of the lens elements of the zoom lens. At the other end of the zoom lens, the sixth lens group G6, which is arranged on the short conjugate length side of the zoom lens, operates as a relay lens.

Figure 3:
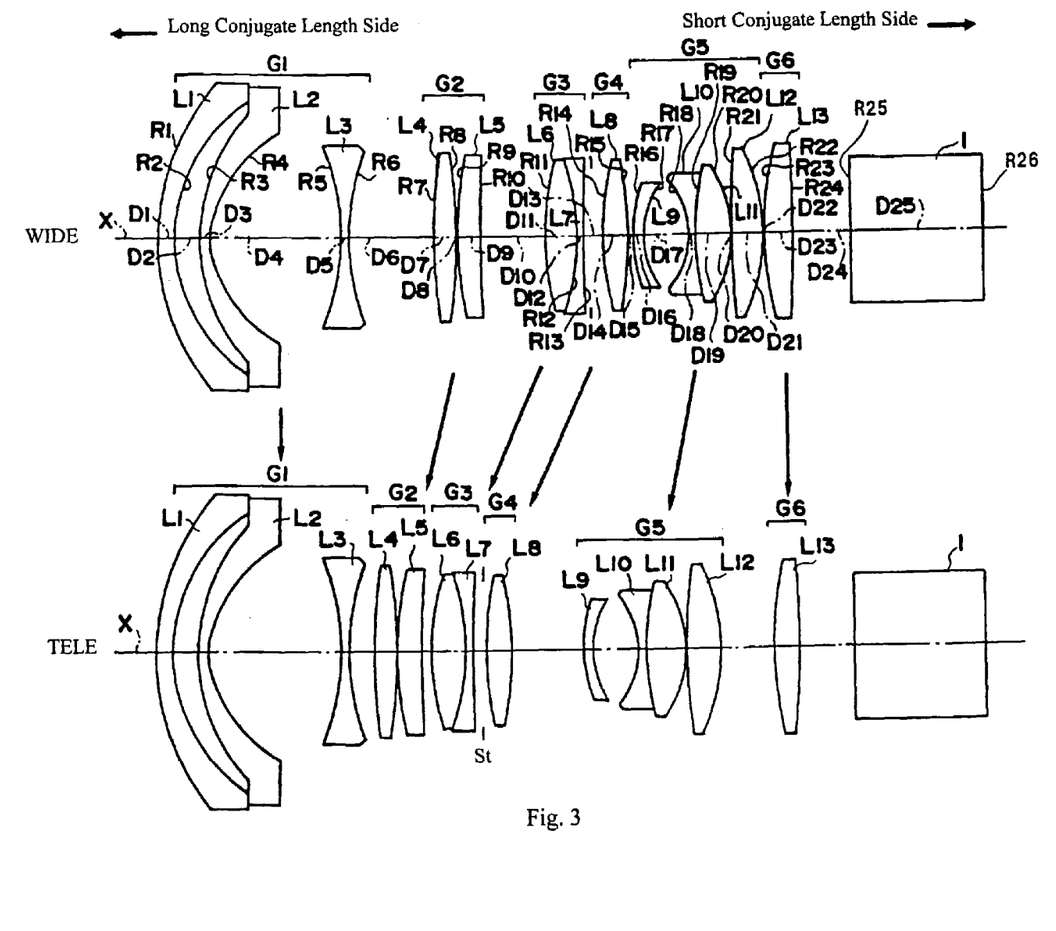
FIG. 3 shows cross-sectional views of the zoom lens of Embodiment 2 at the wide-angle end (WIDE) and at the telephoto end (TELE)

In this zoom lens, it is preferable that a stop be arranged between the third lens group G3 and the fourth lens group G4 and that the fifth lens group G5 has positive refractive power. By adopting such a construction, the lens groups on the short conjugate length side of the stop, i.e., all of the fourth lens group G4, the fifth lens group G5, and the sixth lens group G6 have positive refractive power, which enables dispersing the positive refractive power after the stop position, thereby further suppressing aberrations. In FIGS. 1 and 3, the stop is indicated by the reference label St between lens groups L3 and L4. Due to lack of space, the label St has been omitted from the Wide position shown in FIG. 3, but the stop itself is illustrated.

It is preferable that the first lens group G1 includes, in order from the long conjugate length side, a meniscus lens element and/or meniscus lens component having negative refractive power and having its convex surface on the long conjugate length side, and a lens element and/or lens component having negative refractive power. This is because the occurrence of distortion becomes a problem in a wide-angle lens but the occurrence of such distortion can be suppressed with good efficiency with this construction.

Additionally, it is preferable that the fifth lens group G5 includes, in order from the long conjugate length side, a meniscus lens component having its convex surface on the long conjugate length side, a lens component formed, for example, by cementing together two lens elements, and a lens component having positive refractive power. More preferably, the fifth lens group G5 includes only four lens elements.

Furthermore, preferably the following conditions are satisfied:

|F3/Fw|>5.0    Condition (2)

|F5/Fw|>5.0    Condition (3)

where
F3 is the focal length of the third lens group G3,
F5 is the focal length of the fifth lens group G5, and
Fw is as defined above.

Satisfying Conditions (2) and (3) makes it possible to further suppress spherical aberration and chromatic aberration efficiently.

As shown in FIG. 1, this zoom lens includes a first lens group G1 having negative refractive power, a second lens group G2 having positive refractive power, a third lens group G3, a fourth lens group G4 having positive refractive power, a fifth lens group G5, and a sixth lens group G6 with a simple construction that achieves desired imaging by moving the second lens group G2, the third lens group G3, the fourth lens group G4, and the fifth lens group G5 in coordinated movements different amounts and at different rates along the optical axis X in order to perform zooming, that is, to vary the focal length of the zoom lens and simultaneously to correct the image plane shift with this variation in focal length.

As shown in FIG. 1, the stop St is arranged to be movable with the moving lens groups. The stop St is preferably constructed as at least one variable stop that is preferably arranged between two lens groups that are moved during zooming or within one of the lens groups that is moved during zooming. In either case, this variable stop is moved integrally with at least one lens group that is moved during zooming or the variable stop is moved independently along the optical axis during zooming. In either construction (namely, of moving the variable stop integrally or moving the variable stop independently), the lens on the large conjugate length side can be constructed compactly. However, the stop arrangement shown in FIG. 1 (i.e., between the third lens group G3 and the fourth lens group G4) is only exemplary of various arrangements of a stop that may be used in the present invention.

Additionally, as shown in FIG. 1, reference numeral 1 indicates a glass block that represents a filter, such as a low-pass filter or an infrared cut-off filter, and a color synthesizing optical system (which would operate as a color separating optical system in the reverse direction). The color synthesizing optical system is designed to combine information from displays, such as light valves, that modulate light from a light source with information (not shown in FIG. 1), such as liquid crystal displays or DMDs, that are arrayed on the short conjugate length side of the sixth lens group G6. These features will be discussed in more detail below with regard to a projection display device of the present invention after discussions of the zoom lenses of Embodiments 1 and 2 of the present invention.

Embodiments 1 and 2 of the zoom lens of the present invention will now be individually described with reference to the drawings.

Embodiment 1

FIG. 1 shows the basic lens element configuration of the zoom lens of Embodiment 1. Embodiment 1 includes the preferable features of the zoom lens of the present invention of a stop St positioned between the third lens group G3 and the fourth lens group G4, and of the fifth lens group G5 having positive refractive power. The third lens group G3 has negative refractive power. Additionally, the first lens group G1 and the sixth lens group G6 are fixed during zooming, and the first lens group is movable along the optical axis for focusing the zoom lens independent of the zoom setting.

Additionally, the first lens group G1 is formed of three lens components, each of which is a lens element and has negative refractive power, in order from the long conjugate length side, L1, L2, and L3. Lens element L2 has aspheric surfaces on both sides. The second lens group G2 is formed of two lens components, each of which is a lens element and has positive refractive power, in order from the long conjugate length side, L4 and L5. The third lens group G3 is formed as a lens component made up of lens element L6 having positive refractive power and lens element L7 having negative refractive power. The fourth lens group G4 is formed as a lens component that is also a lens element L8 having positive refractive power.

The fifth lens group G5 has positive refractive power and is formed of, in order from the long conjugate length side, a lens element L9 having negative refractive power with a concave surface on the short conjugate length side that is a lens component, a lens element L10 having negative refractive power with a concave surface on the long conjugate length side, a lens element L11 having positive refractive power and that is cemented to lens element L10 to form a lens component, and lens element L12 having positive refractive power that is a lens component. The sixth lens group G6 is formed as a lens component that is also a lens element L13 having positive refractive power.

Table 1 below lists the surface number #, in order from the long conjugate length side, the radius of curvature R of each surface on the optical axis, the on-axis surface spacing D, as well as the refractive index $N_d$ and the Abbe number $v_d$ (at the d-line) of each optical element for Embodiment 1, except that the on-axis surface spacings that vary with zooming are listed in Table 3 below. The numerical values of R and D are based on a normalized focal length of 1 at the wide-angle end configuration of the zoom lens of Embodiment 1 with the zoom lens focused at infinity. Listed in the bottom portion of Table 1 are the focal length f and the f-number $F_{NO}$ at the wide-angle and telephoto ends, and the maximum field angle 2ω at the wide-angle end and at the telephoto end for Embodiment 1.

TABLE 1

| # | R | D | $N_d$ | $v_d$ |
|---|---|---|---|---|
| 1 | 2.073 | 0.177 | 1.71300 | 53.9 |
| 2 | 1.421 | 0.316 | | |
| 3* | 2.089 | 0.101 | 1.53039 | 55.2 |
| 4* | 1.275 | 0.766 | | |
| 5 | −3.322 | 0.078 | 1.49700 | 81.6 |
| 6 | 3.322 | $D_6$(variable) | | |
| 7 | 5.592 | 0.239 | 1.83400 | 37.2 |

TABLE 1-continued

| # | R | D | $N_d$ | $v_d$ |
|---|---|---|---|---|
| 8 | −5.592 | 0.010 | | |
| 9 | 3.111 | 0.253 | 1.80100 | 35.0 |
| 10 | 10.075 | $D_{10}$(variable) | | |
| 11 | −4.674 | 0.186 | 1.58913 | 61.2 |
| 12 | −2.372 | 0.071 | 1.84666 | 23.8 |
| 13 | −6.824 | $D_{13}$(variable) | | |
| 14 | 3.156 | 0.253 | 1.77250 | 49.6 |
| 15 | −5.740 | $D_{15}$(variable) | | |
| 16 | 1.876 | 0.101 | 1.63980 | 34.5 |
| 17 | 1.082 | 0.459 | | |
| 18 | −0.911 | 0.066 | 1.80518 | 25.4 |
| 19 | 3.098 | 0.381 | 1.49700 | 81.6 |
| 20 | −1.300 | 0.010 | | |
| 21 | 11.046 | 0.351 | 1.76200 | 40.1 |
| 22 | −1.811 | $D_{22}$(variable) | | |
| 23 | 3.578 | 0.303 | 1.83400 | 37.2 |
| 24 | −14.723 | 0.626 | | |
| 25 | ∞ | 1.382 | 1.51633 | 64.1 |
| 26 | ∞ | | | |
| f = 1.0–1.8 | $F_{NO}$ = 1.7–2.0 | 2ω = 64.0°–37.2° | | |

The lens surfaces with a * to the right of the surface number in Table 1 are aspheric lens surfaces, and the aspheric surface shapes of these lens surfaces are expressed by Equation (A) above.

Table 2 below lists the values of the constant K and the aspheric coefficients $A_4$, $A_6$, $A_8$, and $A_{10}$ used in Equation (A) above for each of the aspheric lens surfaces of Table 1. Aspheric coefficients that are not present in Table 2 are zero. An "E" in the data indicates that the number following the "E" is the exponent to the base 10. For example, "1.0E−2" represents the number $1.0 \times 10^{-2}$.

TABLE 2

| # | K | $A_4$ | $A_6$ | $A_8$ | $A_{10}$ |
|---|---|---|---|---|---|
| 3 | 1.651 | −1.581E−2 | 1.157E−2 | 3.191E−3 | 7.834E−4 |
| 4 | 0.909 | −4.116E−2 | 2.111E−3 | 4.449E−3 | −1.313E−4 |

In the zoom lens of Embodiment 1, lens groups $G_2$, $G_3$, $G_4$, and $G_5$ move to vary the separations of the six lens groups during zooming. In particular, these lens groups continuously move along the optical axis X toward the long conjugate length side during zooming to the telephoto end of the zoom range. Therefore, the values of the on-axis spacings $D_6$, $D_{10}$, $D_{13}$, $D_{15}$, and $D_{22}$ vary. Table 3 below lists the values of the variables $D_6$, $D_{10}$, $D_{13}$, $D_{15}$, and $D_{22}$ (i.e., the group spacings) at the wide-angle end (zoom ratio of 1.0) and at the telephoto end (zoom ratio of 1.8).

TABLE 3

| Zoom ratio | $D_6$ | $D_{10}$ | $D_{13}$ | $D_{15}$ | $D_{22}$ |
|---|---|---|---|---|---|
| 1.0 | 1.234 | 0.572 | 0.523 | 0.068 | 0.010 |
| 1.8 | 0.264 | 0.245 | 0.100 | 0.923 | 0.874 |

As set forth in Table 4 below, the zoom lens of Embodiment 1 of the present invention satisfies all of Conditions (1) through (3) above.

TABLE 4

| Condition No. | Condition | Value |
|---|---|---|
| (1) | Ft/Fw ≧ 1.5 | 1.8 |
| (2) | |F3/Fw| > 5.0 | 9.0 |
| (3) | |F5/Fw| > 5.0 | 46.7 |

Figure 2A:
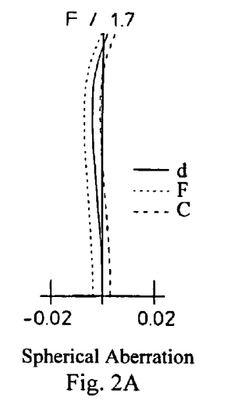
FIGS. 2A–2D show aberrations of the zoom lens of Embodiment 1 at the wide-angle end.
Figure 2B:
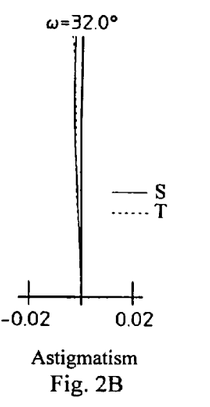
Figure 2C:
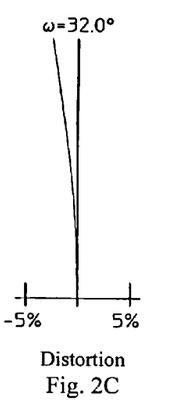
Figure 2D:
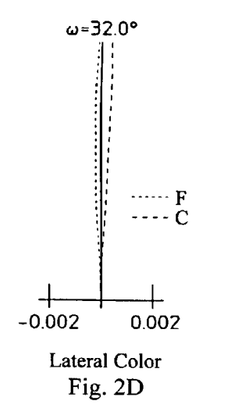
Figure 2E:
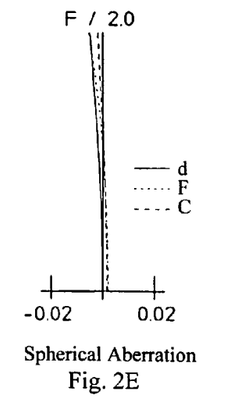
FIGS. 2E–2H show aberrations of the zoom lens of Embodiment 1 at the telephoto end.
Figure 2F:
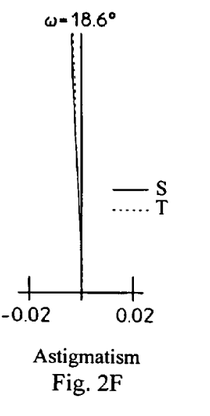
Figure 2G:
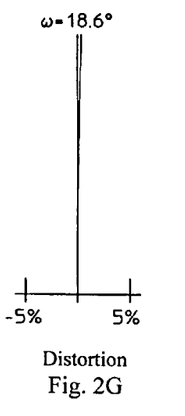
Figure 2H:
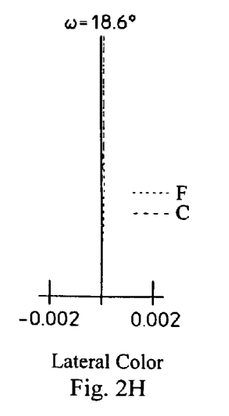

FIGS. 2A–2D show the spherical aberration, astigmatism, distortion, and lateral color, respectively, of the zoom lens of Embodiment 1 at the wide-angle end with a zoom ratio of 1.0. FIGS. 2E–2H show the spherical aberration, astigmatism, distortion, and lateral color, respectively, of the zoom lens of Embodiment 1 at the telephoto end with a zoom ratio of 1.8. In FIGS. 2A and 2E, the spherical aberration (in mm) is shown for the wavelengths 587.6 nm (the d-line), 486.1 nm (the F-line), and 656.3 nm (the C-line), and the f-number is shown. In the remaining figures, ω is the half-field angle. In FIGS. 2B and 2F, the astigmatism (in mm) is shown for both the sagittal image surface S and the tangential image surface T and is measured at 587.6 nm (the d-line). In FIGS. 2C and 2G, distortion (in per cent) is measured at 587.6 nm (the d-line). In FIGS. 2D and 2H, the lateral color (in mm) is shown for the wavelengths 486.1 nm (the F-line) and 656.3 nm (the C-line) relative to 587.6 nm (the d-line). As is apparent from these figures, the various aberrations are favorably corrected over the entire zoom range. Additionally, the zoom lens of Embodiment 1 is a zoom lens with a zoom ratio greater than 1.5 and an f-number as bright as 1.7.

Embodiment 2

FIG. 3 shows the basic lens element configuration of the zoom lens of Embodiment 2. Embodiment 2 is similar to Embodiment 1 and therefore only the differences between Embodiment 2 and Embodiment 1 will be explained, except for noting that the fifth lens group G5 has positive refractive power as in Embodiment 1. In Embodiment 2, the third lens group G3 has positive refractive power rather than negative refractive power as in Embodiment 1, although the third lens group is similarly constructed in both Embodiments 1 and 2. Additionally, in lens group G3, the sixth lens element L6 is a biconvex lens element rather than a meniscus lens element and the seventh lens element L7 is a biconcave lens element rather than a meniscus lens element. Embodiment 2 also differs from Embodiment 1 in its lens element configuration by having different radii of curvature of the lens surfaces, different aspheric coefficients of the aspheric lens surfaces, different optical element surface spacings, and some different refractive indexes and Abbe numbers.

Table 5 below lists the surface number #, in order from the long conjugate length side, the radius of curvature R of each surface on the optical axis, the on-axis surface spacing D, as well as the refractive index $N_d$ and the Abbe number $v_d$ (at the d-line) of each optical element for Embodiment 2, except that the on-axis surface spacings that vary with zooming are listed in Table 7 below. The numerical values of R and D are based on a normalized focal length of 1 at the wide-angle end configuration of the zoom lens of Embodiment 2 with the zoom lens focused at infinity. Listed in the bottom portion of Table 5 are the focal length f and the f-number $F_{NO}$ at the wide-angle and telephoto ends, and the maximum field angle 2ω at the wide-angle end and at the telephoto end for Embodiment 2.

TABLE 5

| # | R | D | $N_d$ | $v_d$ |
|---|---|---|---|---|
| 1 | 3.130 | 0.219 | 1.48749 | 70.2 |
| 2 | 2.143 | 0.313 | | |
| 3* | 1.683 | 0.125 | 1.53039 | 55.2 |
| 4* | 1.012 | 1.702 | | |
| 5 | −2.922 | 0.097 | 1.49700 | 81.6 |
| 6 | 2.922 | $D_6$(variable) | | |
| 7 | 7.670 | 0.277 | 1.83481 | 42.7 |
| 8 | −7.670 | 0.013 | | |
| 9 | 4.683 | 0.313 | 1.84666 | 23.8 |
| 10 | 26.011 | $D_{10}$(variable) | | |
| 11 | 3.426 | 0.431 | 1.51823 | 59.0 |
| 12 | −2.741 | 0.088 | 1.84666 | 23.8 |
| 13 | 31.200 | $D_{13}$(variable) | | |
| 14 | 4.833 | 0.313 | 1.68893 | 31.1 |
| 15 | −4.208 | $D_{15}$(variable) | | |
| 16 | 1.859 | 0.082 | 1.68893 | 31.1 |
| 17 | 1.205 | 0.619 | | |
| 18 | −1.021 | 0.081 | 1.84666 | 23.8 |
| 19 | 3.467 | 0.501 | 1.58913 | 61.2 |
| 20 | −1.435 | 0.013 | | |
| 21 | 8.723 | 0.444 | 1.72916 | 54.7 |
| 22 | −2.308 | $D_{22}$(variable) | | |
| 23 | 5.418 | 0.292 | 1.84666 | 23.8 |
| 24 | −11.583 | 0.712 | | |
| 25 | ∞ | 1.712 | 1.51633 | 64.1 |
| 26 | ∞ | | | |
| f = 1.0–1.6 | $F_{NO}$ = 1.7–1.9 | 2ω = 75.8°–50.2° | | |

The lens surfaces with a * to the right of the surface number in Table 5 are aspheric lens surfaces, and the aspheric surface shapes of these lens surfaces are expressed by Equation (A) above.

Table 6 below lists the values of the constant K and the aspheric coefficients $A_4$, $A_6$, $A_8$, and $A_{10}$ used in Equation (A) above for each of the aspheric lens surfaces of Table 5. Aspheric coefficients that are not present in Table 6 are zero. An "E" in the data indicates that the number following the "E" is the exponent to the base 10. For example, "1.0E-2" represents the number $1.0 \times 10^{-2}$.

TABLE 6

| # | K | $A_4$ | $A_6$ | $A_8$ | $A_{10}$ |
|---|---|---|---|---|---|
| 3 | 0.234 | −9.772E−2 | 4.096E−2 | −6.739E−3 | 4.924E−4 |
| 4 | −0.058 | −6.427E−2 | 1.758E−2 | 1.408E−2 | −2.787E−3 |

In the zoom lens of Embodiment 2, lens groups $G_2$, $G_3$, $G_4$, and $G_5$ move to vary the separations of the six lens groups during zooming. In particular, these lens groups continuously move along the optical axis X toward the long conjugate length side during zooming to the telephoto end of the zoom range. Therefore, the values of the on-axis spacings $D_6$, $D_{10}$, $D_{13}$, $D_{15}$, and $D_{22}$ vary. Table 7 below lists the values of the variables $D_6$, $D_{10}$, $D_{13}$, $D_{15}$, and $D_{22}$ (i.e., the group spacings) at the wide-angle end (zoom ratio of 1.0) and at the telephoto end (zoom ratio of 1.6).

TABLE 7

| Zoom ratio | $D_6$ | $D_{10}$ | $D_{13}$ | $D_{15}$ | $D_{22}$ |
|---|---|---|---|---|---|
| 1.0 | 1.092 | 0.842 | 0.259 | 0.129 | 0.013 |
| 1.6 | 0.328 | 0.125 | 0.177 | 0.973 | 0.730 |

As set forth in Table 8 below, the zoom lens of Embodiment 2 of the present invention satisfies all of Conditions (1) through (3) above.

TABLE 8

| Condition No. | Condition | Value |
|---|---|---|
| (1) | Ft/Fw ≧ 1.5 | 1.6 |
| (2) | |F3/Fw| > 5.0 | 113.2 |
| (3) | |F5/Fw| > 5.0 | 12.4 |

Figure 4A:
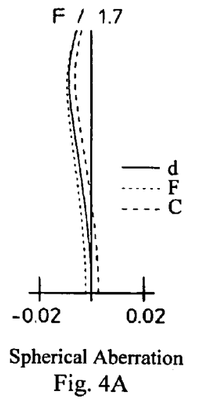
FIGS. 4A–4D show aberrations of the zoom lens of Embodiment 2 at the wide-angle end.
Figure 4B:
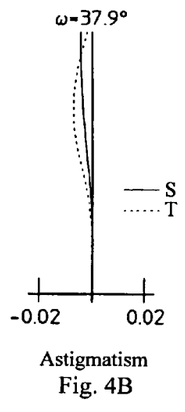
Figure 4C:
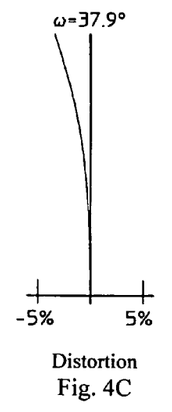
Figure 4D:
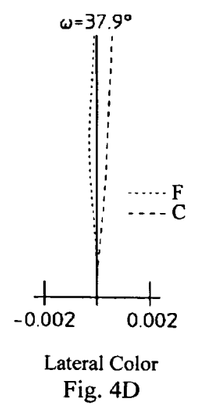
Figure 4E:
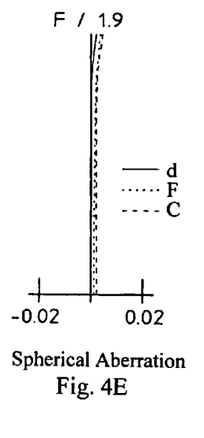
FIGS. 4E–4H show aberrations of the zoom lens of Embodiment 2 at the telephoto end.
Figure 4F:
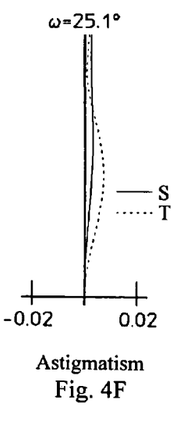
Figure 4G:
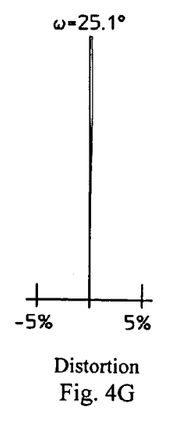
Figure 4H:
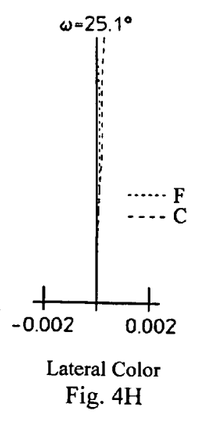

FIGS. 4A–4D show the spherical aberration, astigmatism, distortion, and lateral color, respectively, of the zoom lens of Embodiment 2 at the wide-angle end with a zoom ratio of 1.0. FIGS. 4E–4H show the spherical aberration, astigmatism, distortion, and lateral color, respectively, of the zoom lens of Embodiment 2 at the telephoto end with a zoom ratio of 1.6. In FIGS. 4A and 4E, the spherical aberration (in mm) is shown for the wavelengths 587.6 nm (the d-line), 486.1 nm (the F-line), and 656.3 nm (the C-line), and the f-number is shown. In the remaining figures, ω is the half-field angle. In FIGS. 4B and 4F, the astigmatism (in mm) is shown for both the sagittal image surface S and the tangential image surface T and is measured at 587.6 nm (the d-line). In FIGS. 4C and 4G, distortion (in per cent) is measured at 587.6 nm (the d-line). In FIGS. 4D and 4H, the lateral color (in mm) is shown for the wavelengths 486.1 nm (the F-line) and 656.3 nm (the C-line) relative to 587.6 nm (the d-line). As is apparent from these figures, the various aberrations are favorably corrected over the entire zoom range. Additionally, the zoom lens of Embodiment 2 is a zoom lens with a zoom ratio greater than 1.5 and an f-number as bright as 1.7.

The zoom lens of the present invention is designed for combining information from displays, such as liquid crystal displays or DMDs, that modulate light from a light source (not shown in FIG. 1 or FIG. 3) with information, and that are arrayed on the short conjugate length side of the sixth lens group G6, along with a color synthesizing optical system and other structures, represented by the glass block 1 in FIGS. 1 and 3, as discussed above, and is further designed for projecting the combined information onto a projection plane positioned on the long conjugate length side of the sixth lens group G6. The present invention is further directed to a projection display device that includes such a zoom lens for such projection.

Figure 5:
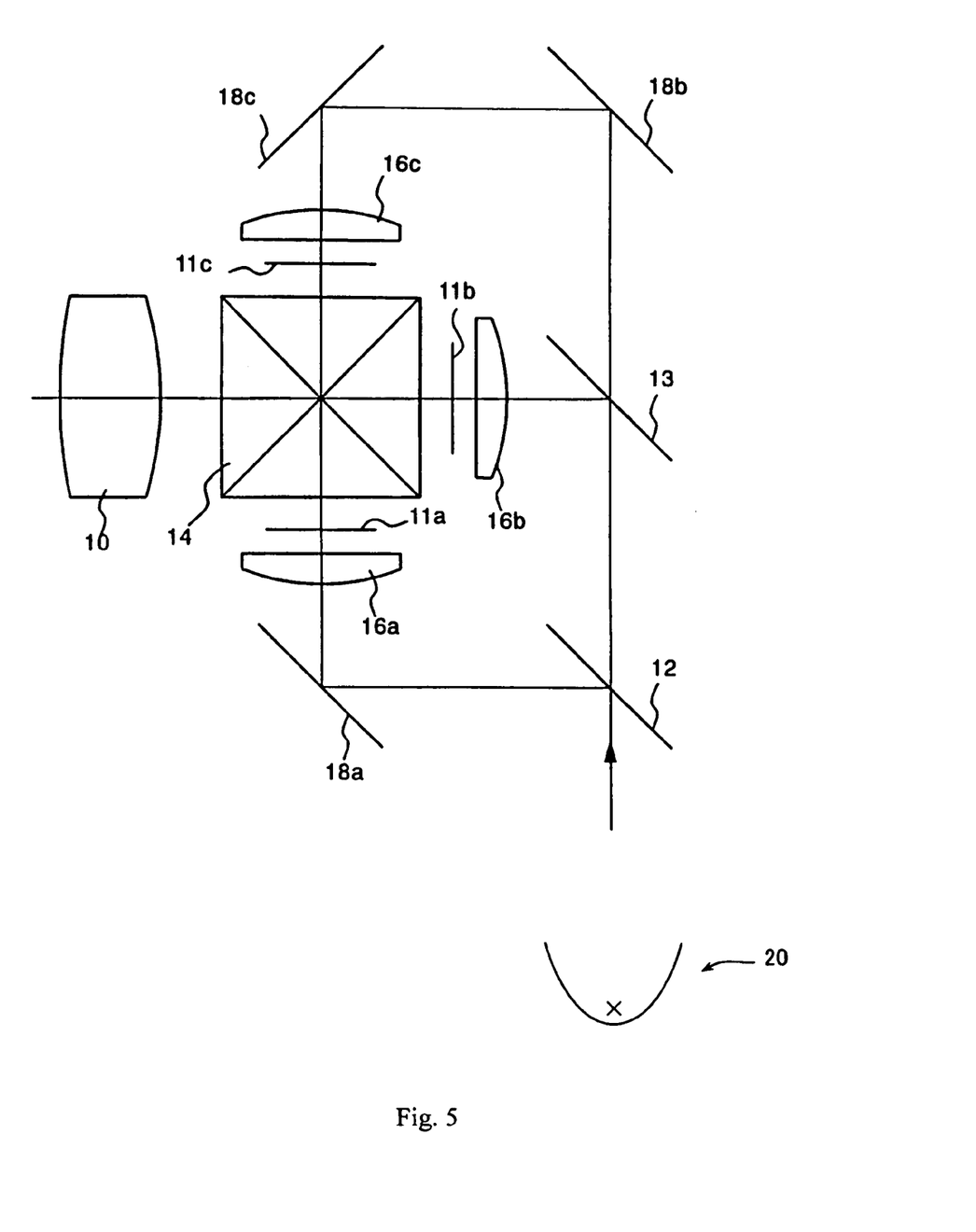
FIG. 5 shows a schematic cross-sectional view of a projection display device in which a zoom lens of the present invention may be used.

FIG. 5 shows a schematic cross-sectional view of such a projection display device in which a zoom lens of the present invention may be used. As shown in FIG. 5, the projection display device includes a light source and an illuminating optical unit referenced by reference numeral 20 that provides white light to be divided before reaching transmission-type liquid crystal displays 11a, 11b, and 11c, before being recombined and proceeding to a zoom lens of the present invention 10 that serves as a projection lens for the projection display device.

As shown in FIG. 5, the projection display device includes dichroic mirrors 12 and 13 for color separation so that three color light beams (green, red, and blue) are produced, and a different one of the three color light beams illuminates and is modulated with image information by a different one of the three displays 11a, 11b, and 11c. Condensing lenses 16a, 16b, and 16c, and totally reflecting mirrors 18a, 18b, and 18c assist in proper illumination of the three displays 11a, 11b, and 11c. A dichroic prism 14 combines the three light beams modulated by the three displays and directs the combined light beam toward the projection lens 10, which is a zoom lens of the present invention. An illuminating optical unit may include numerous optical elements in optical series before the dichroic mirror 12 that provide various optical functions, such as collimating the light beam, as is indicated generally by a curved solid line referenced by reference numeral 20 in FIG. 5, which may be interpreted as a parabolic reflector serving to collimate light from a point light source, which is indicated by a small "x" centered above the curved line. The zoom lens of the present invention is arranged in FIG. 5 so that it receives the modulated light from the short conjugate length side of the zoom lens and projects the modulated light to the long conjugate length side of the zoom lens. The projection display device of the present invention has a relatively large zoom ratio, a wide-angle projection, and produces a projected image of high quality using the zoom lens of the present invention.

The present invention is not limited to the aforementioned embodiments, as it will be obvious that various alternative implementations are possible. For instance, the number of lens elements and lens components in each lens group may be varied. Additionally, values such as the radius of curvature R of each of the lens elements and components, the surface spacings D, the refractive index $N_d$, as well as the Abbe number $v_d$, are not limited to the examples indicated in each of the aforementioned embodiments, as other values can be adopted. Furthermore, the zoom lens according to the present invention is not limited to the form used as the projection lens of a projection display device that uses transmission-type liquid crystal displays but may be used as a projection lens for devices that use other light modulation means, such as reflection-type liquid crystal displays or DMDs. Additionally, the zoom lens of the present invention may be used as an image forming lens in a camera, such as a camera using one of various image pickup tubes, a CCD, or photographic film. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A zoom lens for receiving light modulated by an image display located on the short conjugate length side of the zoom lens and for projecting the modulated light to the long conjugate length side of the zoom lens, the zoom lens comprising, in order from the long conjugate length side of the zoom lens:
   a first lens group having negative refractive power and including at least one aspheric surface;
   a second lens group having positive refractive power, that includes at least two lens components, and that moves during zooming;
   a third lens group that moves during zooming;
   a fourth lens group having positive refractive power that moves during zooming;
   a fifth lens group that moves during zooming; and
   a sixth lens group;
   wherein
   a stop is arranged between the third lens group and the fourth lens group,
   the fifth lens group has positive refractive power, and the following condition is satisfied:

$Ft/Fw \geq 1.5$ where
   Ft is the focal length of the zoom lens at the telephoto end when the zoom lens is focused at infinity on the long conjugate length side, and
   Fw is the focal length of the zoom lens at the wide-angle end when the zoom lens is focused at infinity on the long conjugate length side.

2. The zoom lens of claim 1, wherein the zoom lens includes only six lens groups.

3. The zoom lens of claim 2, wherein the first lens group and the sixth lens group are fixed during zooming.

4. A zoom lens for receiving light modulated by an image display located on the short conjugate length side of the zoom lens and for projecting the modulated light to the long conjugate length side of the zoom lens, the zoom lens comprising, in order from the long conjugate length side of the zoom lens:
   a first lens group having negative refractive power and including at least one aspheric surface;
   a second lens group having positive refractive power, that includes at least two lens components, and that moves during zooming;
   a third lens group that moves during zooming;
   a fourth lens group having positive refractive power that moves during zooming;
   a fifth lens group that moves during zooming; and
   a sixth lens group;
   wherein
   the first lens group includes, in order from the long conjugate length side, a meniscus lens component having negative refractive power with its convex surface on the long conjugate length side of the zoom lens, and a lens component having negative refractive power,
   the first lens group and the sixth lens group are fixed during zooming, and
   the following condition is satisfied:

$Ft/Fw \geq 1.5$ where
   Ft is the focal length of the zoom lens at the telephoto end when the zoom lens is focused at infinity on the long conjugate length side, and
   Fw is the focal length of the zoom lens at the wide-angle end when the zoom lens is focused at infinity on the long conjugate length side.

5. The zoom lens of claim 4, wherein the zoom lens includes only six lens groups.

6. A zoom lens for receiving light modulated by an image display located on the short conjugate length side of the zoom lens and for projecting the modulated light to the long conjugate length side of the zoom lens, the zoom lens comprising, in order from the long conjugate length side of the zoom lens:
   a first lens group having negative refractive power and including at least one aspheric surface;
   a second lens group having positive refractive power, that includes at least two lens components, and that moves during zooming;
   a third lens group that moves during zooming;
   a fourth lens group having positive refractive power that moves during zooming;
   a fifth lens group that moves during zooming; and
   a sixth lens group;
   wherein the fifth lens group includes, in order from the long conjugate length side of the zoom lens, a meniscus lens component having its convex surface on the long conjugate length side of the zoom lens, a lens component formed by cementing together two lens elements, and a lens component having positive refractive power, and the following condition is satisfied:

$$Ft/Fw \geq 1.5$$

where
- Ft is the focal length of the zoom lens at the telephoto end when the zoom lens is focused at infinity on the long conjugate length side, and
- Fw is the focal length of the zoom lens at the wide-angle end when the zoom lens is focused at infinity on the long conjugate length side.

7. The zoom lens of claim 6, wherein the zoom lens includes only six lens groups.

8. The zoom lens of claim 7, wherein the first lens group and the sixth lens group are fixed during zooming.

9. A zoom lens for receiving light modulated by an image display located on the short conjugate length side of the zoom lens and for projecting the modulated light to the long conjugate length side of the zoom lens, the zoom lens comprising, in order from the long conjugate length side of the zoom lens:
- a first lens group having negative refractive power and including at least one aspheric surface;
- a second lens group having positive refractive power, that includes at least two lens components, and that moves during zooming;
- a third lens group that moves during zooming;
- a fourth lens group having positive refractive power that moves during zooming;
- a fifth lens group that moves during zooming; and
- a sixth lens group;

wherein the following conditions are satisfied:

$$Ft/Fw \geq 1.5$$

$$|F3/Fw| > 5.0$$

$$|F5/Fw| > 5.0$$

where
- Ft is the focal length of the zoom lens at the telephoto end when the zoom lens is focused at infinity on the long conjugate length side,
- Fw is the focal length of the zoom lens at the wide-angle end when the zoom lens is focused at infinity on the long conjugate length side,
- F3 is the focal length of the third lens group, and
- F5 is the focal length of the fifth lens group.

10. The zoom lens of claim 9, wherein the zoom lens includes only six lens groups.

11. The zoom lens of claim 10, wherein the first lens group and the sixth lens group are fixed during zooming.

12. A projection display device comprising:
- a zoom lens for receiving light modulated by an image display located on the short conjugate length side of the zoom lens and for projecting the modulated light to the long conjugate length side of the zoom lens, the zoom lens comprising, in order from the long conjugate length side of the zoom lens:
- a first lens group having negative refractive power and including at least one aspheric surface;
- a second lens group having positive refractive power, that includes at least two lens components, and that moves during zooming;
- a third lens group that moves during zooming;
- a fourth lens group having positive refractive power that moves during zooming;
- a fifth lens group that moves during zooming; and
- a sixth lens group;

wherein the following condition is satisfied:

$$Ft/Fw \geq 1.5$$

where
- Ft is the focal length of the zoom lens at the telephoto end when the zoom lens is focused at infinity on the long conjugate length side, and
- Fw is the focal length of the zoom lens at the wide-angle end when the zoom lens is focused at infinity on the long conjugate length side;
- a light source located on the short conjugate length side of the zoom lens, and an illuminating optical system that guides light from the light source; and
- at least one image display located on the short conjugate length side of the zoom lens and that receives light from the light source that is guided by the illuminating optical system so that the image display modulates the light with information;

wherein
- the first lens group and the sixth lens group are fixed during zooming, and
- the zoom lens receives the modulated light from the at least one image display and projects the modulated light to the long conjugate length side of the zoom lens.

13. The projection display device of claim 12, wherein the zoom lens includes only six lens groups.

14. A zoom lens for receiving light modulated by an image display located on the short conjugate length side of the zoom lens and for projecting the modulated light to the long conjugate length side of the zoom lens, the zoom lens comprising, in order from the long conjugate length side of the zoom lens:
- a first lens group having negative refractive power and including at least one aspheric surface;
- a second lens group having positive refractive power, that includes at least two lens components, and that moves during zooming;
- a third lens group that moves during zooming;
- a fourth lens group having positive refractive power that moves during zooming;
- a fifth lens group that moves during zooming; and
- a sixth lens group;

wherein
- the zoom lens includes only eleven lens components, and
- the following condition is satisfied:

$$Ft/Fw \geq 1.5$$

where
- Ft is the focal length of the zoom lens at the telephoto end when the zoom lens is focused at infinity on the long conjugate length side, and
- Fw is the focal length of the zoom lens at the wide-angle end when the zoom lens is focused at infinity on the long conjugate length side.

15. The zoom lens of claim 14, wherein the zoom lens includes only thirteen lens elements.

16. A zoom lens for receiving light modulated by an image display located on the short conjugate length side of the zoom lens and for projecting the modulated light to the long conjugate length side of the zoom lens, the zoom lens comprising, in order from the long conjugate length side of the zoom lens:
- a first lens group having negative refractive power and including at least one aspheric surface;
- a second lens group having positive refractive power, that includes at least two lens components, and that moves during zooming;

a third lens group that moves during zooming;
a fourth lens group having positive refractive power that moves during zooming;
a fifth lens group that moves during zooming; and
a sixth lens group;
wherein
the first lens group and the sixth lens group are fixed during zooming, and
the following condition is satisfied:

$Ft/Fw \geq 1.5$ where
Ft is the focal length of the zoom lens at the telephoto end when the zoom lens is focused at infinity on the long conjugate length side, and
Fw is the focal length of the zoom lens at the wide-angle end when the zoom lens is focused at infinity on the long conjugate length side.

* * * * *